(12) United States Patent
Yanagishita

(10) Patent No.: US 11,319,067 B2
(45) Date of Patent: May 3, 2022

(54) DRONE FOR CAPTURING IMAGES OF FIELD CROPS

(71) Applicant: NILEWORKS INC., Tokyo (JP)

(72) Inventor: Hiroshi Yanagishita, Tokyo (JP)

(73) Assignee: Nileworks, Tokyo (JP)

( * ) Notice: Subject to any disclaimer, the term of this patent is extended or adjusted under 35 U.S.C. 154(b) by 84 days.

(21) Appl. No.: 16/492,851

(22) PCT Filed: Mar. 6, 2018

(86) PCT No.: PCT/JP2018/008497
§ 371 (c)(1),
(2) Date: Sep. 10, 2019

(87) PCT Pub. No.: WO2018/168565
PCT Pub. Date: Sep. 20, 2018

(65) Prior Publication Data
US 2021/0316857 A1    Oct. 14, 2021

(30) Foreign Application Priority Data
Mar. 12, 2017    (JP) .............................. JP2017-046844

(51) Int. Cl.
*B64C 39/02*    (2006.01)
*A01G 7/00*    (2006.01)
(Continued)

(52) U.S. Cl.
CPC .............. *B64C 39/024* (2013.01); *A01G 7/00* (2013.01); *B64D 47/08* (2013.01); *G06N 20/00* (2019.01); *B64C 2201/127* (2013.01)

(58) Field of Classification Search
CPC ... B64C 39/024; B64C 2201/127; A01G 7/00; B64D 47/08
See application file for complete search history.

(56) References Cited

U.S. PATENT DOCUMENTS 10,175,362 B2 *    1/2019    Redden .................... A01G 7/00
10,845,301 B2 *    11/2020    Ni .......................... G01N 21/31
(Continued)

FOREIGN PATENT DOCUMENTS

CN    108001687 A    *    5/2018    ........... B64C 39/024
JP    2006264573 A    *    10/2006    ............. B64C 27/06
(Continued)

OTHER PUBLICATIONS

Chen etal, "The Drones are Coming unmanned aerial vehicles for Agriculture", 2015, Citrograph vol. 6 No 4, pp. 18-22 (Year: 2015).*

(Continued)

*Primary Examiner* — Peter D Nolan
*Assistant Examiner* — Kenneth M Dunne

(57) ABSTRACT

The present invention provides a drone (unmanned aerial vehicle) capable of photographing a base part of the stem and a side of the leaf of the field crops for evaluating their growth status. A camera is positioned on the unmanned aerial vehicle such that the camera's field of view is directed backward with respect to the direction of the unmanned aerial vehicle. The camera captures an image of the crop temporarily knocked down by the downdraft created by the rotor of the drone, which exposes the base part of the stem and the side of the leaf to the sky. Optionally, the depression angle of the camera is automatically adjusted depending on the flight speed, wind force, and wind direction. Optionally, the camera body is automatically rotated to be directed to backward when the drone changes flying directions.

12 Claims, 3 Drawing Sheets

(51) Int. Cl.
 *B64D 47/08* (2006.01)
 *G06N 20/00* (2019.01)

(56) References Cited

U.S. PATENT DOCUMENTS

| | | | |
|---|---|---|---|
| 11,050,979 B2 * | 6/2021 | Gornik | A01B 79/005 |
| 11,074,447 B1 * | 7/2021 | Fox | G01N 21/84 |
| 11,100,641 B1 * | 8/2021 | Malahe | G06N 20/00 |
| 11,188,752 B2 * | 11/2021 | Papanikolopoulos | G06T 17/00 |
| 2014/0146303 A1 | 5/2014 | Mitchell et al. | |
| 2016/0216245 A1 * | 7/2016 | Sutton | G06K 9/00523 |
| 2016/0217562 A1 * | 7/2016 | Ulman | H04N 5/2258 |
| 2016/0280397 A1 * | 9/2016 | Christ | H04N 5/23299 |
| 2018/0068164 A1 * | 3/2018 | Cantrell | B64C 39/024 |
| 2018/0267008 A1 * | 9/2018 | Sutton | G06T 7/70 |
| 2018/0335372 A1 * | 11/2018 | Oral | A01G 3/00 |
| 2018/0364157 A1 * | 12/2018 | Ghiraldi | A01C 21/007 |
| 2019/0220964 A1 * | 7/2019 | Mello | B64D 47/00 |
| 2020/0077601 A1 * | 3/2020 | McCall | B64C 39/024 |
| 2020/0253127 A1 * | 8/2020 | McCall | G06K 9/6274 |
| 2020/0273172 A1 * | 8/2020 | Weldemariam | A01B 79/005 |
| 2021/0073692 A1 * | 3/2021 | Saha | B64F 1/362 |
| 2021/0287001 A1 * | 9/2021 | Meltzer | A01G 22/05 |

FOREIGN PATENT DOCUMENTS

| | | | | |
|---|---|---|---|---|
| WO | WO 2016065071 A1 * | 4/2016 | | A01M 1/026 |
| WO | WO 2017077543 A1 * | 5/2017 | | H04W 4/185 |

OTHER PUBLICATIONS

Yu et al, "Crop Row Segmentation and Detection in Paddy Fields Based on Treble-Classification Otsu and Double-Dimensional Clustering Method", 2021, Remote sensing, whole document (Year: 2021).*

Lass et al, "A review of remote sensing of invasive weeds and example of the early detection of spotted knapweed (Centaurea maculosa) and babysbreath (Gypsophila paniculata) with a hyperspectral sensor", 2005, Weed Science, Whole Document (Year: 2005).*

Khan et al, "Weed Detection in Crops Using Computer Vision", 2016, University of Central Punjab, Whole Document (Year: 2016).*

Barrero et al, "Weed Detection in Rice Fields Using Aerial Images and Neural Networks", 2016, IEEE, whole document (Year: 2016).*

Calado et al, "Weed emergence as inXuenced by soil moisture and air temperature", 2009, Springer, Whole Document (Year: 2009).*

* cited by examiner

Flying Direction a)

b)

DRONE FOR CAPTURING IMAGES OF FIELD CROPS

TECHNICAL FIELD

The present invention relates to an unmanned aerial vehicle (a drone) suitable for taking pictures of field crops to evaluate their growth status with image analysis.

BACKGROUND ART

A method of taking pictures of field crops from above in the sky with a drone (aka unmanned aerial vehicle or multicopter) or the like in order to evaluate the growth status of the field crops with image analysis is well-known (for example, Patent Document 1). By using a drone flying in a low altitude above the field, more accurate information can be acquired than satellite imagery. There, however, is still a problem that information thus acquired is not precise enough for detailed analysis.

For example, pests of crops such as planthoppers often occur in stems near to the root, but it was difficult to properly take picture of that part above from the sky. Similarly, it was difficult to take pictures lesions occurring on stems near to the root and weeds growing on the water surface. Moreover, in the case of rice, if an image of the shape of the leaves bent by the wind were obtained, the amount of accumulated silicon would be evaluated, and growth of rice can be estimated based on the information and the fertilizer plan can be optimized. However, it was difficult to properly obtain such an image from above the sky.

PRIOR ART DOCUMENTS

Patent Literature

[Patent Document 1] Japanese Patent Publication No. 2003-9664

SUMMARY OF THE INVENTION

Problems to be Solved by the Invention

To provide a drone (unmanned aerial vehicle) that can properly photograph the stubble portion of the crop and the sides of the field.

Means for Solving the Problems

The present invention provides, an unmanned aerial vehicle, comprising: a camera; and rotors, wherein the camera is provided at a position that is substantially rearward with respect to a traveling direction of the unmanned aerial vehicle with a depression angle of about 60 degrees with respect to the horizontal line, and the camera is configured to capture an image of a base part of a stem or a side of a leaf of a field crop exposed by a wind created by the rotors in order to solve the above problem.

The present invention further provides the unmanned aerial vehicle according to Paragraph 0006, further comprising means for adjusting a depression angle of the direction of the camera depending on a flying speed or a wind force or direction in order to solve the above problem.

The present invention further provides the unmanned aerial vehicle according to Paragraph 0006 or 0007, further comprising control means for performing posture control so that the camera is always directed to backward with respect to the traveling direction of the unmanned aerial vehicle when the flying direction is changed in order to solve the above problem.

Further, the present invention provides A method to evaluate the status of the growth, pests or weeds of the field crop comprising inputting the images of the base part of the stem or the side of the leaf of a field crop taken by the camera of the unmanned aerial vehicle according to Paragraph 0006, 0007, or 0008 to a neural network in order to solve the above problem.

Advantageous Effect of the Invention

A drone (unmanned aerial vehicle) that can properly capture images of stems near to the root and leaf sides of field crops is provided.

DESCRIPTION OF THE EMBODIMENTS

Hereinafter, embodiments of the present invention will be described with reference to the drawings. All drawings/figures are exemplary.

Figure 1:
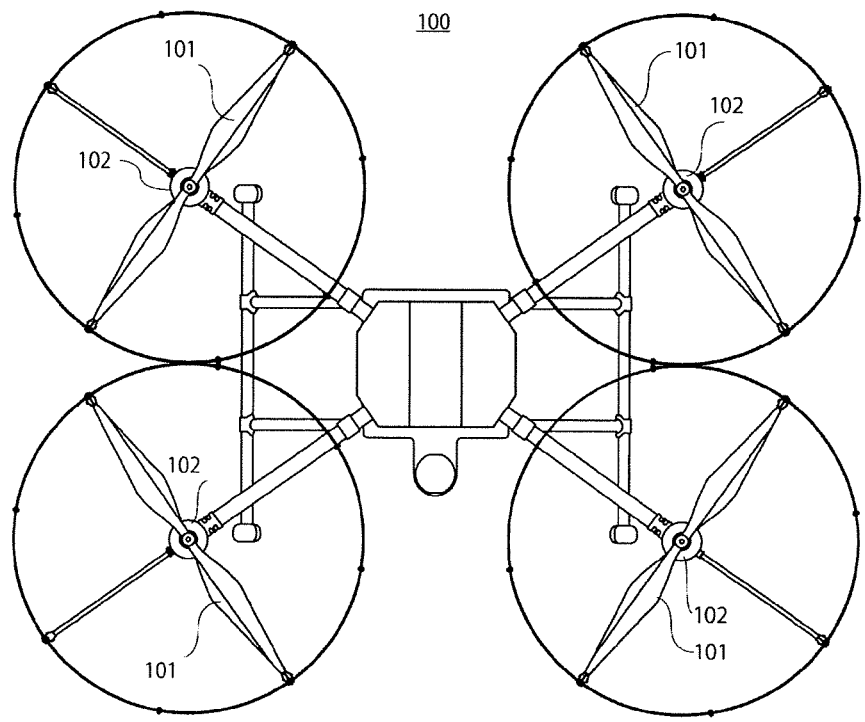
FIG. 1 This is a plan view of an embodiment of a crop field photographing drone according to the present invention.

FIG. 1 shows an overall structure (plan view) of a drone (100) according to the present invention. In the present specification, "drone" refers to any kind of unmanned air vehicles regardless of its driving method or its control method. The rotor (101) and the motor (102) are means for flying the drone. In the figure, a configuration using four sets of two-stage rotors are shown, but the number of rotors and the configuration method may be different. The drone (100) according to the present invention may be equipped with a computer device for controlling flight, a wireless communication device for remote control, a GPS device (preferably, RTK-GPS) for position detection, and a battery or the like, but there components are not explicitly shown in the figure. In addition, components generally required for drones, such as legs for landing, a frame for maintaining the motors, and a safety frame for preventing the hands from touching the rotor blades are illustrated. However, since these components are obvious, and will not be explained in particular.

Figure 2:
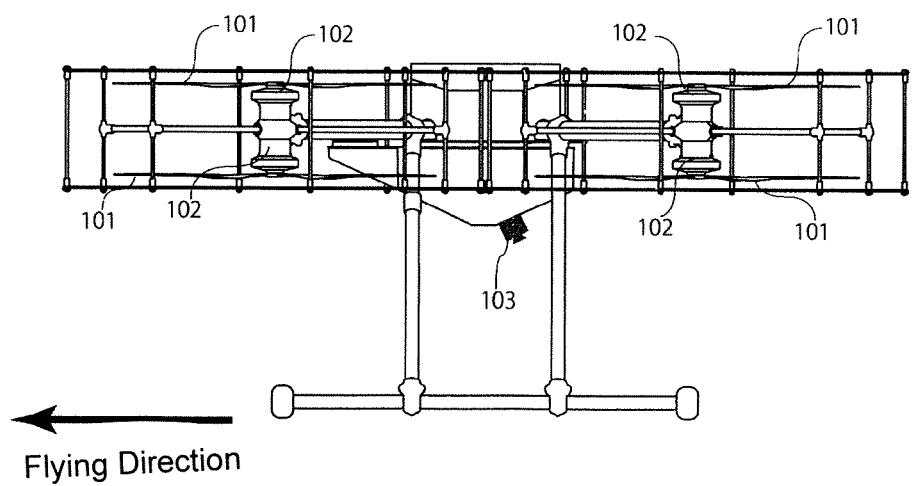
FIG. 2 This is a right side view of an embodiment of a crop field photographing drone according to the present invention.

FIG. 2 shows the overall structure (right side view) of the drone (100) according to the present invention. A camera (103) is provided at the bottom of the drone (100). The camera (103) preferably is capable of continuously capturing video footage of crops in the field. Although not shown, the drone (100) preferably is equipped with storage devices to temporarily store the images taken by the camera (103).

Figure 3:
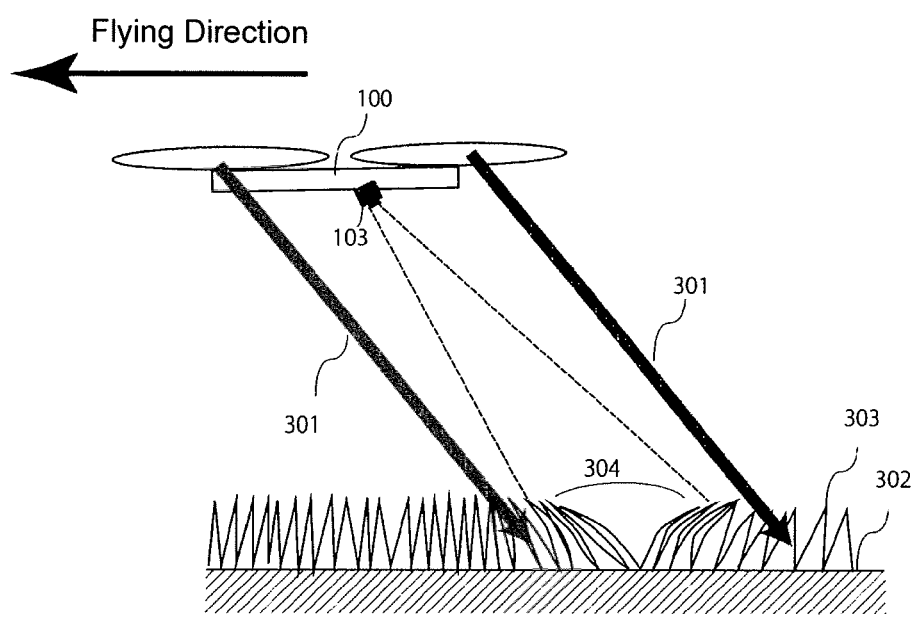
FIG. 3 This is a diagram showing a basic concept of capturing images of the root part of the field crops using an embodiment of a field photographing drone according to the present invention.

As shown in FIG. 3, the airflow (301) created by the rotor blades of the drone (100) generally flows backward the body. Thus, the airflow temporarily knocks down the crops in the field. As a result, behind the drone (100), an area (304)

is created in the field (302) where the root and side portion of the crop (303) of the field (302) are exposed to the sky above. By selectively photographing this area (304) by the camera (103) or by photographing a larger area and extracting the area (304) by image processing, it is possible to capture an image of the near-to-root part and the leaf sides of the crops. The image of the area (304) where the sides of the leaves are exposed to the sky is easy to extract by image processing because the image of the area (304) differs greatly in brightness and saturation compared to the other areas in the field. In addition, the thickness and hardness of the leaves can be estimated from the curved shape of the crop leaves when they are exposed to the wind.

The inventors' experiments have shown that when the drone is moving at a typical speed (about 5 meters per second), the crops most affected by the airflow created by the rotor blades are behind the direction of travel of the drone at an depression angle of about 60 degrees. The camera (103) preferably may be pointed to this direction. Alternatively, the wide-angle camera (103) may be pointed downward of the drone body and the image of the root of the crop and the sides of the leaves can be extracted later.

Since the optimal direction of the camera can vary depending on the flying speed of the drone, a speed sensor may be installed in the drone (100) and the direction of the camera (103) may be adjusted depending of the flying speed using a stepping motor or the like. In addition, since the relative position the area where the crops are temporarily knocked down may be affected by the wind force and direction, the drone (100) may be provided with a wind sensor, and the direction of the camera (103) may be adjusted depending on the wind force and/or direction. The images captured by the camera (103) may be displayed on the remote control unit of the drone (100), and the position of the camera (103) may be fine-tuned manually by the operator of the remote control unit. The camera (103) may be controlled such that it does not take pictures when the drone (100) is hovering or flying at a low speed (e.g., about 3 meters per second or less).

Figure 4:
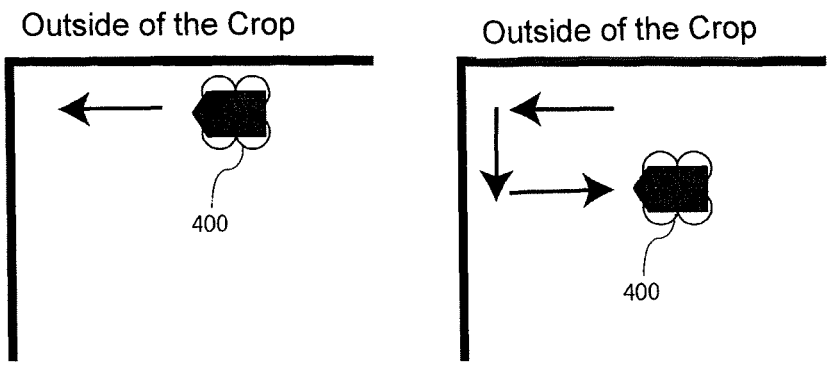
FIG. 4 This is a diagram showing a direction changing method of an embodiment of a field photographing drone according to the present invention.
Figure 4:
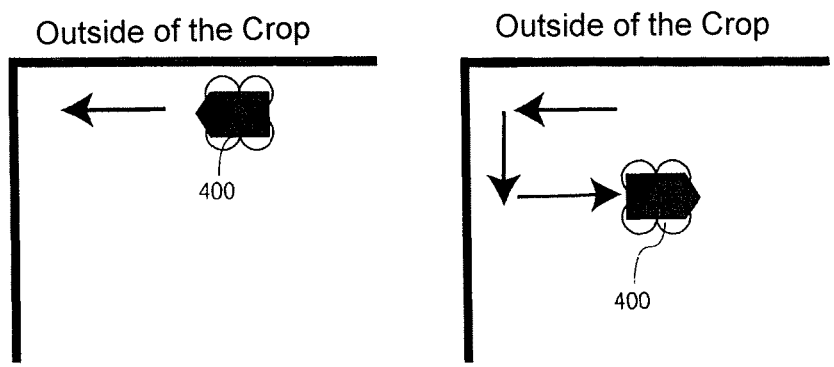

FIG. 4 shows the method of changing the directions of the drone according to the present application. The drone (400) in FIG. 4 is a schematic representation of the drone shown in FIG. 1. In general, when a drone changes direction, it changes only the direction of movement without changing the absolute direction of the body, as shown in FIG. 4-*a*. With the method as shown in FIG. 4-*a*, in order for the camera (103) to always capture the images behind to the direction of travel of the drone (100), multiple (typically four) cameras (103) had to be installed and switched accordingly, or a stepping motor or other means had to be installed to change the direction of the camera (103) every time the drone changes its flying direction.

As an alternative method, as shown in FIG. 4-*b*, the absolute orientation of the body of the drone may change as the flying direction changes. With such a method, it is possible to always photograph the rear view of the traveling direction of the drone (100) with only one camera (103). Although it may be necessary to adjust the depression angle, it is advantageous in terms of cost, weight, and accuracy compared to a method of providing more than one cameras or a method of changing direction of the camera.

Analysis of the images taken by the camera (103) provides a variety of information that could not be obtained previously. For example, the presence of chlorophyll can be detected by analyzing a near-infrared image (e.g., near 780 nm wavelength), which allows only the crop parts to be extracted from the images. Edge detection can be applied to the extracted image of the crop parts to extract the contour lines of the leaves to determine how much the leaves bend when exposed to the wind. This allows the leaf thickness to be estimated and, as a result, the growth condition of the crop can be estimated. Particularly when the crop is rice, it is also possible to determine the amount of silicon accumulation (because silicon increases the hardness of the leaves). In addition, in the water area detected with near-infrared image analysis, the area with dense straight lines (detected by the edge detection) can be presumed to be the base (near-to-the-root) part of the crop. When near-infrared edge detection is applied to the base parts, if the spotted areas are detected, the plant is suspected to be attached to planthoppers. If there are strong red areas are seen at the base of the plant, it is suspected to suffer from sheath blight disease. In addition, since plants are usually planted at 20 to 30 centimeters apart to each other, if the water surface area does not appear evenly spaced in the image, the weeds are presumed to be present. In addition to these image analyses, as the inventors experiments have shown, it is possible to perform an efficient and accurate analysis with machine learning using a large number of image data samples as input to a neural network (preferably a deep neural network).

Technically Significant Advantageous Effect of the Present Invention

With the drone according to the present application, it is possible to efficiently acquire images of the root part of the stems and the side of the leaves of the entire crop in the field. The image thus obtained can be analyzed for an effective and efficient pest control and fertilization plans. In addition, in the case of rice, the shape of the leaves as they are exposed to the wind can be analyzed to evaluate the amount of silicon accumulation, which can be used to estimate the level of growth of the rice plant and optimize a fertilizer plan.

The invention claimed is:

1. An unmanned aerial vehicle comprising:
   a camera;
   an adjustor configured to adjust a depression angle of the camera to a horizontal line, according to a moving speed of the unmanned aerial vehicle, a wind force, or a wind direction; and
   rotors,
   wherein:
   the unmanned aerial vehicle is used for capturing images of field crops to evaluate growth of the field crops,
   the camera is provided on the unmanned aerial vehicle and positioned such that its field of view is at a position that is substantially rearward with respect to the traveling direction of the unmanned aerial vehicle, and
   the camera is configured to capture images of roots or leaves of the field crops exposed by air flow made the rotors.

2. A method for evaluating growth status of field crops, comprising:
   capturing images of parts near roots or leaves of the field crops by a camera attached to an unmanned aerial vehicle; and
   adjusting a depression angle of the camera to a horizontal line, according to a moving speed of the unmanned aerial vehicle, a wind force, or a wind direction,
   wherein the parts near the roots or the leaves of the field crops are exposed by an air flow made by rotors of the unmanned aerial vehicle.

3. A method according to claim 2, wherein: the camera is provided on the unmanned aerial vehicle at a position such that its field of view is substantially rearward with respect to the traveling direction of the unmanned aerial vehicle.

4. A method according to claim 2, further comprising:
evaluating a status of growth, pests, or weeds of the field crop by using machine learning of the images of parts near the roots or the leaves of the field crops.

5. A method according to claim 2, further comprising:
evaluating a status of growth, pests, or weeds of the field crop by feeding the images of parts near the roots or the leaves of the field crops to a neural network.

6. A method according to claim 2, further comprising:
detecting a presence of chlorophyll by analyzing a near-infrared image of the images of parts near the roots or the leaves of the field crops, and
extracting an image consisting of only crops from the near-infrared image.

7. A method according to claim 2, further comprising:
detecting water areas by applying near-infrared image analysis to the images of the parts near roots or leaves of the field crops, and
detecting weeds by judging whether the water areas are evenly spaced.

8. A method for evaluating growth status of field crops, comprising:
capturing images of the parts near the roots or leaves of the field crops by a camera attached to an unmanned aerial vehicle, the parts near the roots or leaves of the field crops being exposed by an air flow made by rotors of the unmanned aerial vehicle;
detecting a presence of chlorophyll by analyzing a near-infrared image of the images of the parts near the roots or the leaves of the field crops;
extracting an image consisting of only crops from the near-infrared image
applying edge detection to the image consisting of only crops to extract the contour lines of the leaves;
determining, from the contour lines, how much leaves bend when exposed to the wind;
estimating leaf thickness, based on the determining how much leaves bend when exposed to the wind; and
evaluating a growth condition of the crop based on the estimating leaf thickness.

9. A method for evaluating growth status of field crops, comprising:
capturing images of the parts near the roots or leaves of the field crops by a camera attached to an unmanned aerial vehicle, the parts near the roots or leaves of the field crops being exposed by an air flow made by rotors of the unmanned aerial vehicle;
detecting water areas by operations comprising applying near-infrared image analysis to the images of the parts near roots or leaves of the field crops,
applying edge detection to an image of the water areas, generating an edge detection result;
detecting a base of the crop, by operations comprising identifying straight lines in the edge detection result; and
detecting insect pests by operations comprising applying near-infrared edge detection to an image of the base of the crop to detect insect pests.

10. A non-transitory computer readable medium that stores a computer-executable program for evaluating growth status of field crops, comprising instructions for:
capturing images of parts near roots or leaves of the field crops by a camera attached to an unmanned aerial vehicle; and
adjusting a depression angle of the camera to a horizontal line, according to a moving speed of the unmanned aerial vehicle, a wind force, or a wind direction,
wherein the parts near the roots or the leaves of the field crops are exposed by an air flow made by rotors of the unmanned aerial vehicle.

11. A non-transitory computer readable medium according to claim 10, wherein: the camera is provided on the unmanned aerial vehicle at a position such that its field of view is substantially rearward with respect to the traveling direction of the unmanned aerial vehicle.

12. A non-transitory computer readable medium according to claim 10, further comprising instructions for:
evaluating a status of growth, pests or weeds of the field crop by using machine learning of the images of parts near the roots or leaves of the field crops.

* * * * *